M. WARNER.
Seed Planter.
No. 29,735.
Patented Aug 21, 1860.
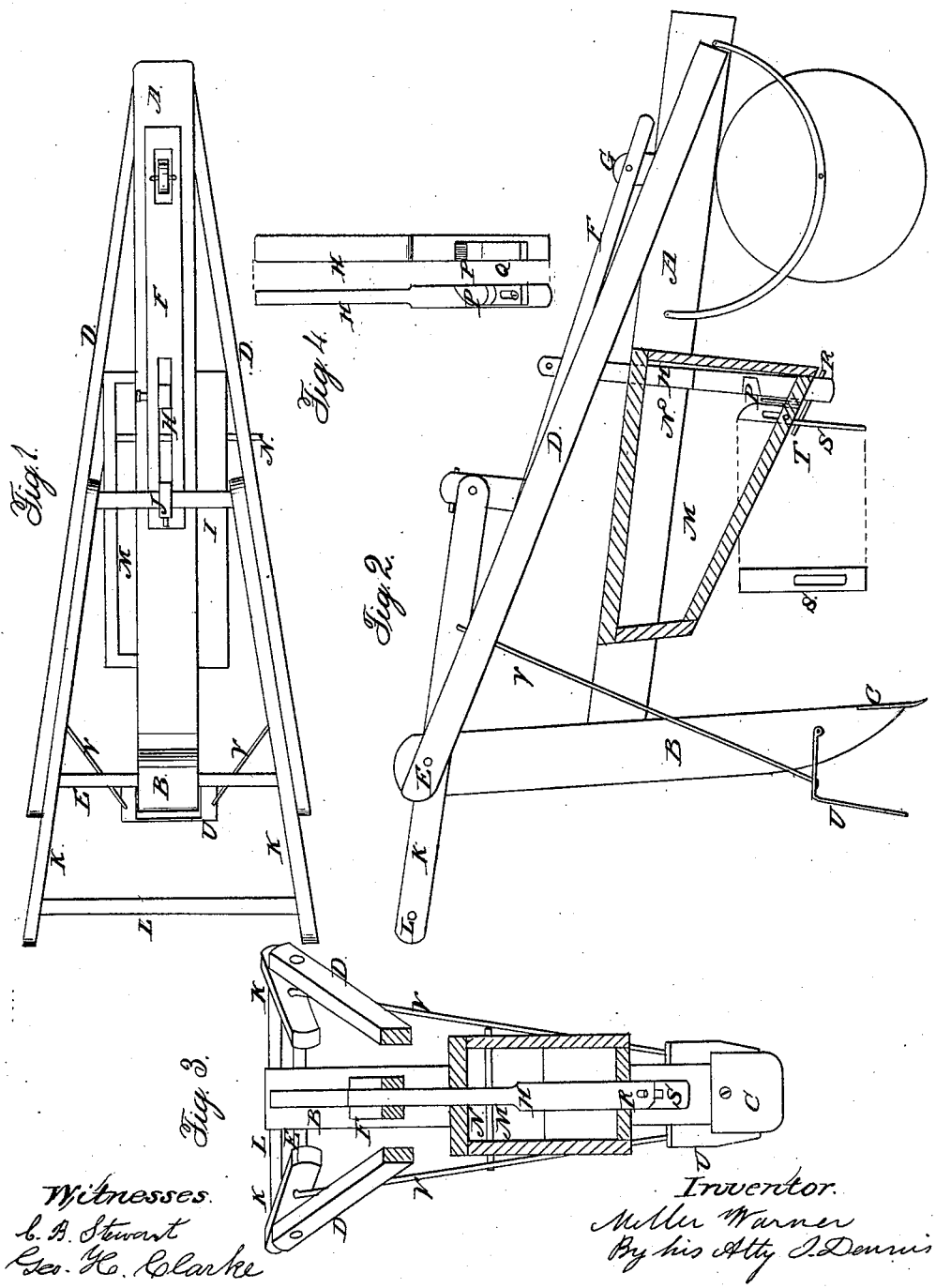
Witnesses.
C. B. Stewart
Geo. H. Clarke
Inventor.
Miller Warner
By his Atty I. Dennis Jr

UNITED STATES PATENT OFFICE.

MILLER WARNER, OF WEST MIDDLEBURG, OHIO.

IMPROVEMENT IN SEED-PLANTERS.

Specification forming part of Letters Patent No. 29,735, dated August 21, 1860.

*To all whom it may concern:*

Be it known that I, MILLER WARNER, of West Middleburg, in the county of Logan and State of Ohio, have invented certain new and useful Improvements in Seed-Planters; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of a seed-planter with my improvements. Fig. 2 is an elevation of one side with the side of the seed-box removed to show the interior; Fig. 3, section of the seed-box on the line $z\,z$, Fig. 2.

The nature of my invention and improvements in seed-planters consists in the arrangement of devices hereinafter described and claimed.

In the accompanying drawings, A is the beam, having the standard B fastened to its rear end, the lower end of which standard is armed with a metal scraper, C, to scrape the earth over the seed and cover it after it is dropped, as will be hereinafter described. The side bars, D D, have their fore ends fastened to the beam A, and their rear ends are supported by the bar or rod E, which passes through the standard B, as shown in the drawings. The lever F vibrates on a pin in the standard G, which standard is fastened near the fore end of the beam for that purpose. The lever F has a slot in it for the upper end of the planting and delivering slide H, which is operated by it. The rear end of the lever F is connected to the rod I by the link J, which rod I connects the fore ends of the handles or levers K K, which vibrate on the rod E, and are connected near their rear ends by the rod L, as shown in Fig. 1.

The seed-box M is made in the form shown in the drawings, or in such other form as will answer the purpose, and fastened to the beam A by the pin N to hold and carry the seed. The slide H is arranged to traverse through the bottom of the seed-box M to deliver the seed by means of the cavity P, which is cut in from two contiguous sides of the slide in the form shown in Fig. 4, and the cavity P is cut long enough to receive the block Q, which has a slot in it, so that it may be adjusted and fastened by a screw, so as to make the seed-delivering cavity larger or smaller and adapt it to the kind and quantity of seed to be delivered. The pin R in the lower end of the slide H works in a slot in the slide S, which I term the "urging-slide," as it urges the seed into the cavity in the slide H. This slide S works in the bottom of the seed-box just behind the slide H and separated from it by a thin partition. When the slide H is pushed down to deliver seed the pin R pushes the slide S down also, and when the slide H is drawn up so that pin R comes to the upper end of the slot in S it forces S up, so as to stir the seed in the box M, and the inclined top of S urges the seed into the cavity P and fills it. There is a small slot in the side of the slide S for the end of the pin T, which prevents the slide from being traversed in or out too far.

To work this machine, the animal which is to draw it is harnessed to the fore end in some convenient manner, and the laborer seizes the handles or the rod L and bears down sufficiently to hold up the slide H until it arrives at the point for depositing the seed, when he lifts the rear end of the machine and pushes down the slide so as to deliver the seed, which is covered by the earth drawn onto it by the scraper C. After the scraper C passes and covers the seed the laborer depresses the handles or levers K K and raises the slide H, which is charged with seed, as before described.

U is a toothed rake, hinged to the standard B, as shown in the drawings, and operated by the rods V V, which connect it to the levers K K. The design and object of this rake is to clear the sods, clods, and stones from the hill of earth carried onto the seed by the scraper C. This rake is so arranged that as the scraper is lifted to pass the hill of earth carried onto the seed the rake is pushed down so as to rake the top of the hill and carry off any clods, stones, or sods, which would be in the way of the young plants if they remained on the hill.

I believe I have described and represented the improvements in seed-planters which I have invented so as to enable any person skilled in the art to make and use them.

I will now state what I desire to secure by Letters Patent, to wit:

The arrangement of the levers K K, rods V V, rake U, delivering-slide H, and seed-box M, the whole being constructed to operate as described, for the purposes set forth.

MILLER WARNER.

Witnesses:
D. S. NORVILL,
JOEL HAINES.